Patented Apr. 17, 1951

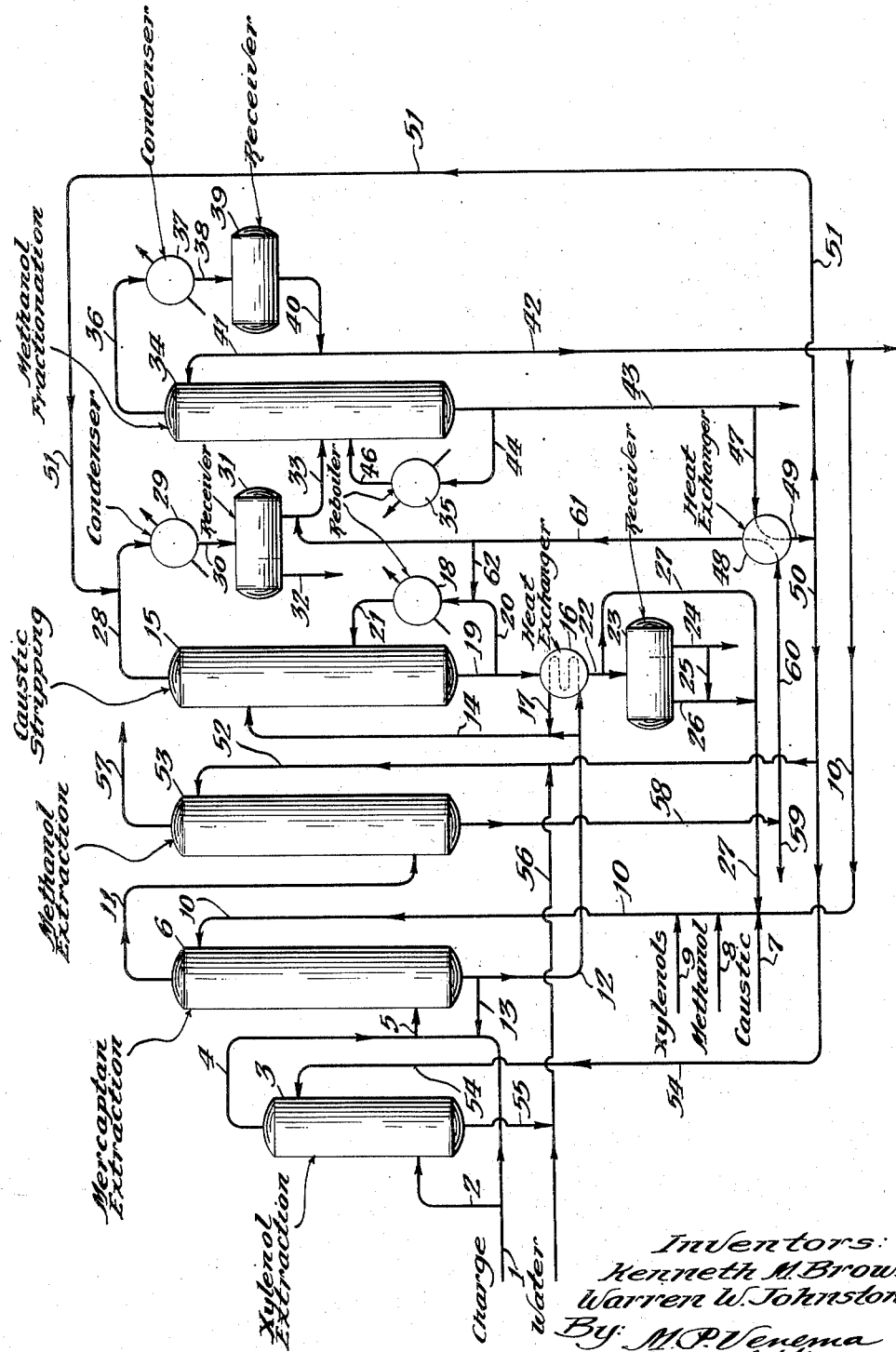

2,549,052

UNITED STATES PATENT OFFICE 2,549,052

DESULFURIZATION OF HYDROCARBON OILS

Kenneth M. Brown, Hinsdale, and Warren W. Johnstone, Riverside, Ill., assignors to Universal Oil Products Company, Chicago, Ill., a corporation of Delaware Application December 23, 1948, Serial No. 66,948

8 Claims. (Cl. 196—32)

This invention relates to the desulfurization of hydrocarbon oils heavier than gasoline in order to remove acidic organic compounds therefrom and more particularly relates to a process employing a reagent solution comprising an alkali and an organic solvent.

This invention is directed to the desulfurization of hydrocarbon distillates boiling above the range of gasoline and thus will include hydrocarbon distillates having an initial boiling point within the range of from 350° F. or lower to 500° F. or higher and an end boiling point within the range of from 500° F. or lower to 700° F. or higher. These distillates are processed to meet specific requirements, depending upon the particular use intended therefore, including heater, furnace or burner oils, Diesel fuels, lubricants, etc. In any event, the presence of acidic organic compounds, and particularly mercaptans, is undesirable because of objectionable corrosion, odor and/or other undesirable properties. The present invention is directed to an improvement in the process for the removal of these acidic components from the hydrocarbon oils.

Because the mercaptans present in heater oil boil within the range of the heater oil and thus are of high molecular weight, the mercaptans are not as readily extracted with caustic methanol solutions as are lower boiling mercaptans. The present invention is directed to a process for improving the extraction of the high boiling mercaptans present in heavier hydrocarbon distillates.

In one embodiment the present invention relates to a process for removing acidic organic compounds from hydrocarbon oil heavier than gasoline which comprises contacting said oil with an alkali-solvent solution containing heavy xylenols, and separating treated oil from said solution. In one specific embodiment, the present invention relates to a process for removing mercaptans from hydrocarbon oil heavier than gasoline which comprises countercurrently contacting said oil with a reagent solution comprising an aqueous solution of from about 35° to about 53° Baumé caustic, about 29 to about 40 volumes of methanol per 100 volumes of said aqueous solution and about 2 to about 20 volumes of heavy xylenols per 100 volumes of said aqueous solution, separating treated oil from the reagent solution, regenerating said reagent solution and thereby separating an overhead fraction comprising mercaptans and methanol and a bottoms fraction comprising caustic and xylenates, further separating mercaptans from methanol, and recycling methanol, caustic and xylenates for further use within the process.

While any suitable alkali reagent, including sodium hydroxide, potassium hydroxide, etc. and any suitable organic solvent which is more soluble in an aqueous solution of an alkali reagent than in hydrocarbons, including methanol, ethanol, propanol, acetone, ethylene glycol, glycol ethers, etc. may be used, the preferred treating reagent comprises an aqueous solution of sodium hydroxide or potassium hydroxide in a low boiling alcohol and particularly methanol, in conjunction with heavy xylenols.

As hereinbefore set forth, as a general rule the higher boiling mercaptans are more difficult to extract with alkaline solutions including causticmethanol solution than are lower boiling mercaptans. In accordance with the present invention, heavy xylenols are incorporated in the treating reagent in order to improve the extraction of the higher boiling mercaptans. It has been found, and will be shown in the example appended to this specification, that the use of heavy xylenols gives improved extraction of mercaptans from West Texas heater oil over that obtained in the absence of the heavy xylenols or by the use of lower boiling phenols. The term "heavy xylenols" as used in the present specification and claims includes homologues of phenols such as cresols, xylenols, other alkylated phenols, etc. which boil within the range of from about 350° to about 600° F. and more particularly within the range of from about 375° to about 550° F. Phenol and cresols boil below 400° F. and generally are retained in 400° F. end point gasoline which is separated by fractional distillation as an overhead fraction from higher boiling oils, and the heavy xylenols remain in the bottoms product or are withdrawn as a side cut along with the distillate boiling above the range of gasoline. The heavy xylenols for use in the present process may be recovered from such heavier oils or they may be obtained from other sources, such as from the products of wood tar distillation or they may be synthetically prepared, etc. In another embodiment of the invention, the heavy xylenols may comprise a single xylenol or other alkylated phenol of the desired boiling range but, in general, the close separation of single compounds is too expensive for practical purposes.

The sodium hydroxide solution for use in the present invention is preferably an aqueous solution of from about 35° to about 53° Baumé gravity, which corresponds to approximately from about 30% to about 60% by weight of caustic and the remainder water. The methanol employed will vary from about 20 to about 40 or more volumes of methanol per 100 volumes of aqueous caustic solution. The methanol may be anhydrous or it may contain varying amounts of water. However, as the water content of the methanol fraction increases, the concentration of the sodium hydroxide solution should be increased accordingly. The heavy xylenols will be used in an amount of from about 2 to about 20 volumes per 100 volumes of aqueous caustic solution.

The mercaptan extraction is generally effected at a temperature of below about 200° F. and usually is within the range of from about 80° to about 100° F. However, it is understood that higher temperatures may be used particularly when higher caustic concentrations are employed in order that the reagent will remain as a homogeneous solution and will not form crystals or become solid.

Upon mixing of the heavy xylenols with the caustic solution, the corresponding xylenates will be formed and, for the purposes of the present invention, the reference to the term heavy xylenols or xylenols is intended to include xylenates. In a preferred embodiment, the present invention is operated to maintain the xylenates at a constant predetermined concentration and, in one embodiment, this is accomplished by removing excess xylenates which may build up in the process due to the extraction of heavy xylenols from the heavy oil charge. In another embodiment, when the charge oil contains substantially no xylenols, additional xylenols may be added to replace the small amount which may be lost in the process.

In another embodiment of the present invention, the desulfurized hydrocarbons are washed with water in order to recover methanol which may be entrained therein. When using water withdrawn from the bottom of the methanol fractionating column, xylenols contained therein may be extracted by and transferred to the desulfurized hydrocarbons. In accordance with the invention, the water from the bottom of the methanol column is preferably contacted with at least a portion of the heater oil charge to thereby transfer the xylenols from the water phase to the hydrocarbon phase before using the water for washing the charge oil. In this way, the heavy xylenols are retained within the system and therefore the predetermined concentration thereof is held constant.

The invention is further illustrated in the accompanying diagrammatic flow drawing and the following description thereof. In the interest of simplicity, the following description will be limited to the use of a caustic-methanol-heavy xylenol solution, although it is understood that other solutions as hereinbefore set forth may be employed. Further, in the interest of simplicity, valves, pumps, mixers, and similar kinds of equipment have been omitted from the drawing.

Referring to the drawing, the charge oil is introduced to the process through line 1 and may be directed, all or in part, through line 2 to xylenol extraction zone 3, wherein the charge oil is contacted with the water fraction withdrawn from the bottom of the methanol fractionator to transfer xylenols from the water fraction to the charge oil, in the manner to be hereinafter set forth. As a general rule, the amount of charge oil supplied to zone 6 will comprise only a minor proportion of the charge oil to the process as it only need be in an amount sufficient to extract the cresols and xylenols from the water fraction. The charge oil is then directed through lines 4 and 5, along with the remaining portion of the charge oil being directed through line 1, to mercaptan extraction zone 6. In zone 6, the charge oil is intimately contacted with caustic, methanol and xylenols, in the concentrations hereinbefore set forth, introduced at the start of the process through lines 7, 8 and 9 respectively, and directed through line 10 to mercaptan extraction zone 6. After the unit has been on stream, introduction of these materials from an external source, except as required for make-up, may be stopped and these materials may be recycled from within the process in the manner to be hereinafter set forth.

It is understood that one, two or more mercaptan extraction zones may be employed and these may be vertical or horizontal and may or may not contain some form of contacting means, such as trays, bubble decks, side-to-side pans, etc., and/or packing material such as carbon Raschig rings, etc. The packing material should not be detrimentally affected by the caustic, methanol, xylenols, and hydrocarbons at the operating conditions prevailing in this zone. It is also understood that external mixing means, such as orifice mixers, mixing pumps, etc., may be employed, particularly when horizontal settling type chambers are utilized.

In the case herein illustrated, the oil charge passes upwardly through zone 6 and is intimately contacted therein with the reagent solution, whereby acidic organic compounds, and particularly mercaptans, are converted into the corresponding sodium salts and are dissolved in the reagent solution. The rates of flow of the charge oil and of the reagent solution are controlled so that the treated gasoline, being withdrawn through line 11 from the upper portion of zone 6 contains substantially less mercaptans than the charge oil introduced through line 1.

Reagent solution is withdrawn from the lower portion of extraction zone 6 through line 12 and, while a portion thereof may be recycled by way of lines 13, 1 and 5 to zone 6, the remaining portion is directed through lines 12 and 14 to caustic stripping zone 15. Preferably, however, the reagent solution is passed through heat exchanger 16 in order to exchange heat with the regenerated caustic solution and is then directed through lines 17 and 14 to stripping zone 15.

Caustic stripping zone 15 may be the same as or different from mercaptan extraction zone 6 and may or may not contain packing material such as carbon Raschig rings etc. or contacting means such as bubble trays, side to side pans, etc. Although in the case here illustrated heat is supplied to the lower portion of zone 15 by means of reboiler 18, it is understood that other suitable means of supplying heat to the stripping zone, such as by means of superheated steam, etc., may be employed in accordance with the present invention. Further, when required, a suitable cooling and refluxing medium may be supplied to the top of the stripping zone in order to assist in the separation of the desired products therein.

In stripping zone 15, the reagent solution is regenerated by hydrolysis to convert the mercaptides to mercaptans and to thereby regenerate caustic. Heat is supplied to the lower portion of stripper 15 by means of reboiler 18, through which a suitable heat exchange medium is passed, in order to maintain the lower portion of the stripping zone at the boiling point of the regenerated aqueous caustic solution. This temperature will generally be within the range of from about 220° to about 300° F., depending on the concentration of the aqueous caustic solution. The regenerated caustic solution is withdrawn from the lower portion of zone 15 through line 19, a portion thereof is directed through line 20, reboiler 18, and line 21 back to stripping zone 15, while the remaining portion is directed through heat exchanger 16 and line 22 to receiver 23. In heat exchanger 16, the hot caustic solution is cooled to a temperature at which xylenates will separate from caustic in receiver 23. In the case, as hereinbefore set forth, where the xylenates tend to build up in the system, the excess xylenates may be withdrawn from the process through line 24. The desired amounts of xylenates may be directed through line 25 to mix with the caustic solution being withdrawn through line 26 and the mixture is recycled by way of lines 27 and 10 to mercaptan extractor 6 for use in the process. In the case where the xylenates being withdrawn from the caustic stripper are in the desired amount, receiver 23 may be omitted and the caustic solution containing the desired amount of xylenates may be directed through lines 27 and 10 to mercaptan extraction zone 6. On the other hand where the amount of xylenates is below that desired, additional xylenols may be introduced through line 9 in the manner hereinbefore set forth.

The overhead fraction withdrawn from caustic stripping zone 15 will comprise mercaptans, methanol, water and, in most cases, a small amount of entrained xylenols. This fraction is directed through line 28, condenser 29, and line 30 to receiver 31. In receiver 31, an equilibrium separation of mercaptans and xylenols from methanol and water takes place. The mercaptans are removed from the process through line 32, while the remaining components are directed through line 33 to methanol fractionator 34.

Methanol fractionator 34 may be the same as or different from mercaptan extraction zone 6 and caustic stripping zone 15 and thus may contain suitable packing material or contacting means such as bubble trays, side to side pans, etc. In the case here illustrated, heat is supplied to the lower portion of fractionator 34 by means of reboiler 35. In fractionator 34, methanol is distilled overhead and removed from the upper portion of this zone through line 36 and is directed through condenser 37 and line 38 into receiver 39. The methanol is removed from receiver 39 through line 40 and a portion thereof is recycled by way of line 41 to the upper portion of fractionator 34 to serve as a cooling and refluxing medium therein, while the remaining portion is directed through lines 42 and 10 for further use within the process. When desired, excess methanol may be removed from the process through the extension line 42 as illustrated.

The water fraction separated in zone 34 is withdrawn from the lower portion thereof through line 43, a portion being recycled by way of line 44, reboiler 35 and line 46 to zone 34, while the remaining portion may be removed, all or in part, from the process through line 43 or preferably is directed, all or in part, through line 47, heat exchanger 48 and line 49 into line 50. When desired, a portion of the water stream may be directed through line 51 to line 28 to combine with the overhead from caustic stripper 15 in order to supply the water desired for assisting in the separation of mercaptans from the methanol in receiver 31. While the remaining portion of the water may be directed from line 50 through line 52 to methanol extraction zone 53 in order to recover methanol from the desulfurized hydrocarbons, the water fraction, as hereinbefore set forth, may contain heavy xylenols which would in turn be transferred to the desulfurized hydrocarbons and thereby be lost from the system. A preferred embodiment of the invention, particularly when the heavy xylenols are not in excess and therefore must be retained within the system, the water stream is directed through lines 50 and 54 to extraction zone 3, wherein the heavy xylenols are transferred to the incoming charge oil in the manner hereinbefore set forth. The water from extraction zone 3 is withdrawn from the lower portion thereof through line 55 and is directed through lines 56 and 52 to extraction zone 53 to recover methanol from the desulfurized hydrocarbons. When desired, water from an extraneous source may be introduced through an extension of line 56 for use in the process when all or a portion of the water is withdrawn from the process through the extension of line 42 as hereinbefore set forth.

The desulfurized hydrocarbons are withdrawn from the upper portion of zone 53 through line 57, while the methanol-containing water is withdrawn from the lower portion of zone 53 through line 58 and, while all or a portion may be removed from the process through line 59, at least a portion thereof is preferably directed through line 60, heat exchanger 48, and line 61 to caustic stripper 15 by way of lines 62 and 20, reboiler 18 and line 21, and/or to methanol fractionator 34 by way of lines 61 and 33. In stripper 15, it is desired to utilize the water for hydrolyzing the reagent solution and preferably the water is introduced either into the lower portion of the caustic stripper, by well known means not illustrated, or through the reboiler as illustrated. In the case of the water to methanol fractionator 34, it is desired to strip methanol from the water in this case the water is preferably introduced at a mid-point in zone 34 as illustrated.

The following example is introduced for the purpose of further illustrating the novelty and utility of the present invention but not with the intention of unduly limiting the same.

A sour West Texas heater oil containing 0.08% mercaptan sulfur and 0.81% total sulfur was used as the charging stock to the process. The heater oil had an A. P. I. gravity of 39.3°, an initial boiling point of 351° F., a 50% boiling point of 459° F. and an end boiling point of 590° F.

Different samples of the heater oil were treated with three different reagent solutions as described hereinafter. Each series of tests comprised a 5 stage batch-wise agitation at 90° F. In each stage the treatment consisted of intimately contacting the oil and reagent for 20 minutes followed by 15 minutes settling. The spent reagent solution was then drawn off and a portion of the oil was analyzed for mercaptan content. The potentiometric method for mercaptan sulfur determinations was used.

Reagent solution A consisted of 75 volumes of 48° Baumé sodium hydroxide and 25 volumes of anhydrous methanol. Reagents B and C consisted of 75 volumes of 48° Baumé sodium hydroxide, 25 volumes of anhydrous methanol and 20 volumes of gasoline boiling range phenols or heavy xylenols as described below. In order that these tests are directly comparable, the weight of sodium hydroxide was held constant in all cases and this meant using 10 volumes of reagent A per 100 volumes of oil and 12 volumes of reagents B and C per 100 volumes of oil.

Reagent solution B contained gasoline boiling range phenols which had a specific gravity at 60° F. of 1.037, an initial boiling point of 227° F., a 50% boiling point of 388° F., a 90% boiling point of 388° F., and an end boiling point of 418° F.

Reagent solution C contained heavy xylenols which had a specific gravity at 60° F. of 1.0231, an initial boiling point of 464° F., a 50% boiling point of 501° F., a 90% boiling point of 548° F. and an end boiling point of 590° F.

The results of these tests are shown in the following table:

Table

| Reagent Solution | A | B | C |
| --- | --- | --- | --- |
| Mercaptan Sulfur, weight per cent: | | | |
| after 1st stage | 0.0320 | 0.0242 | 0.0193 |
| after 2nd stage | .0254 | .0150 | .0087 |
| after 3rd stage | .0218 | .0117 | .0046 |
| after 4th stage | .0193 | .0091 | .0029 |
| after 5th stage | .0175 | .0077 | .0018 |

It will be noted from the data in the above table that, reagent solution A comprising caustic-methanol reduced the mercaptan content of the heater oil from 0.80% to 0.0175% after 5 stages of treatment. Reagent solution B containing phenols boiling within the range of gasoline reduced the mercaptan content after 5 stages to 0.0077%. On the other hand, reagent solution C containing heavy xylenols reduced the mercaptan content to 0.0018% after 5 stages of treatment. Therefore, with the West Texas sour heater oil, the use of heavy xylenols shows an improvement over the use of phenols within the gasoline boiling range or over the use of caustic-methanol without added xylenols.

We claim as our invention:

1. A process for removing acidic organic compounds from hydrocarbon oil heavier than gasoline which comprises contacting said oil with an alkali-solvent solution containing from about 2 to about 20 volumes of heavy xylenols per 100 volumes of said solution, and separating treated oil from said solution.

2. A process for removing acidic organic compounds from hydrocarbon oil heavier than gasoline which comprises countercurrently contacting said oils with a reagent solution comprising caustic, methanol and from about 2 to about 20 volumes of heavy xylenols per 100 volumes of said solution, separating treated oil from the reagent solution, regenerating said reagent solution and thereby separating an overhead fraction comprising mercaptans and methanol and a bottoms fraction comprising caustic and xylenates, further separating mercaptans from methanol, and recycling methanol, caustic and xylenates for further use within the process.

3. A process for removing mercaptans from hydrocarbon oil heavier than gasoline which comprises countercurrently contacting said oil with a reagent solution comprising an aqueous solution of from about 35° to about 53° Baumé caustic, about 20 to about 40 volumes of methanol per 100 volumes of said aqueous solution and about 2 to about 20 volumes of heavy xylenols per 100 volumes of said aqueous solution, separating treated oil from the reagent solution, regenerating said reagent solution and thereby separating an overhead fraction comprising mercaptans, methanol and water and a bottoms fraction comprising caustic, xylenates, and water, further separating mercaptans from methanol, further separating xylenates from caustic-water solution, and recycling methanol, caustic and xylenates for further use within the process in proportions as hereinbefore set forth.

4. A process for removing heavy mercaptans from sour hydrocarbon oil heavier than gasoline which comprises countercurrently contacting said oil with a reagent solution comprising an aqueous solution of from about 35° to about 53° Baumé caustic, about 20 to about 40 volumes of methanol per 100 volumes of said aqueous solution and about 2 to about 20 volumes of heavy xylenols per 100 volumes of said aqueous solution, separating treated oil from said reagent solution, regenerating said reagent solution and thereby separating an overhead fraction comprising mercaptans, methanol, water and xylenols and a bottoms fraction comprising caustic, water and xylenates, separating a mercaptan-xylenol fraction, from a methanol-water fraction also containing xylenols, further separating methanol from a water-xylenol fraction, contacting said water-xylenol fraction with at least a portion of the hydrocarbon oil charge to transfer at least a portion of the xylenols from the water phase to the hydrocarbon oil phase, and washing said treated oil with the resultant water to recover methanol entrained in said treated oil.

5. A process for removing heavy mercaptans from sour hydrocarbon oil heavier than gasoline which comprises countercurrently contacting said oil with a reagent solution comprising an aqueous solution of from about 35° to about 53° Baumé caustic, about 20 to about 40 volumes of methanol per 100 volumes of said equeous solution and about 2 to about 20 volumes of heavy xylenols per 100 volumes of said aqueous solution, separating treated oil from the reagent solution, regenerating said reagent solution and thereby separating mercaptans and methanol from a fraction comprising caustic, water and xylenates, cooling the last mentioned fraction and thereafter separating xylenates from a caustic-water solution, removing excess xylenates from the process, and recycling xylenates in proportion as hereinbefore set forth along with said caustic-water solution within the process for further use therein.

6. A process for removing heavy mercaptans from sour hydrocarbon oil heavier than gasoline which comprises countercurrently contacting said oil with a reagent solution comprising an aqueous solution of from about 35° to about 53° Baumé caustic, about 20 to about 40 volumes of methanol per 100 volumes of said aqueous solution and about 2 to about 20 volumes of heavy xylenols per 100 volumes of said aqueous solution, separating treated oil containing entrained methanol from the reagent solution, regenerating said reagent solution and thereby separating an overhead fraction comprising mercaptans, methanol, water and xylenols and a bottoms fraction comprising caustic, water and xylenates, separating a mercaptan-heavy xylenol fraction from a methanol-water fraction containing heavy xylenols, further separating methanol from a water-heavy xylenol fraction passing said water-heavy xylenol fraction in contact with at least a portion of the hydrocarbon oil charge to transfer heavy xylenols from the water phase to the hydrocarbon oil phase, utilizing the water substantially free from heavy xylenols to wash the treated oil to transfer methanol from the hydrocarbon phase to the water phase, and returning the methanol-containing water within the process to recover methanol for further use within the process.

7. The process as defined in claim 1 further characterized in that said xylenols boil within the range of from about 350° F. to about 600° F.

8. The process as defined in claim 2 further characterized in that said xylenols boil within the range of from about 350° F. to about 600° F.

KENNETH M. BROWN.
WARREN W. JOHNSTONE.

REFERENCES CITED

The following references are of record in the file of this patent:

UNITED STATES PATENTS

| Number | Name | Date |
| --- | --- | --- |
| 1,954,959 | Stratford et al. | Apr. 17, 1934 |
| 2,043,254 | Malisoff | June 9, 1936 |
| 2,315,384 | Ayers et al. | Mar. 30, 1943 |
| 2,317,053 | Henderson | Apr. 20, 1943 |
| 2,413,945 | Bolt | Jan. 7, 1947 |